United States Patent [19]

Nonnenmacher et al.

[11] Patent Number: 4,573,341

[45] Date of Patent: Mar. 4, 1986

[54] METHOD AND APPARATUS FOR MEASURING HYSTERESIS OF A POSITION SENSOR

[75] Inventors: Ronald C. Nonnenmacher, Woodhaven; David V. Tinder, Dearborn, both of Mich.

[73] Assignee: United Technologies Automotive, Inc., Dearborn, Mich.

[21] Appl. No.: 737,140

[22] Filed: May 23, 1985

[51] Int. Cl.[4] .............................................. G01M 15/00
[52] U.S. Cl. ...................................... 73/1 D; 73/116
[58] Field of Search ................. 73/119 R, 1 D, 1 DV, 73/116, 432 A, 432 K, 432 SD

[56] References Cited

U.S. PATENT DOCUMENTS 4,407,155 10/1983 Sundeen ................................ 73/116
4,433,572 2/1984 Sundeen ................................ 73/116

*Primary Examiner*—Jerry W. Myracle
*Attorney, Agent, or Firm*—Stephen A. Schneeberger

[57] ABSTRACT

A method and apparatus is provided for measuring the hysteresis error of a position sensor for a reciprocating element, such as the sensor for determining piston TDC in a reciprocating engine. The sensor is of the proximity type and has a sensing region past which a vane relatively moves. Event timing signals are provided by voltage transitions occasioned by the leading and trailing edges respectively of the vane passing the sensor. The method includes moving a pair of test vanes in opposite directions past the sensor to simulate two passes thereby of a reciprocating vane to generate the event timing signals from the sensor. This may be done by mounting the test vanes on a pair of rotating discs. Independently of the sensor, reference timing signals are generated which are accurately indicative of the positioning of the leading and trailing edges of the one or more test vanes. These reference timing signals may be determined optically. An event timing signal is then compared with a respective corresponding reference timing signal for each of two of the reference timing signals symmetrically disposed with respect to the position to be determined, i.e. TDC, and a difference value is determined for each of those two comparisons. Finally, the two difference values are compared to determine a further difference value, that further difference value being a measure of the hysteresis error.

7 Claims, 4 Drawing Figures

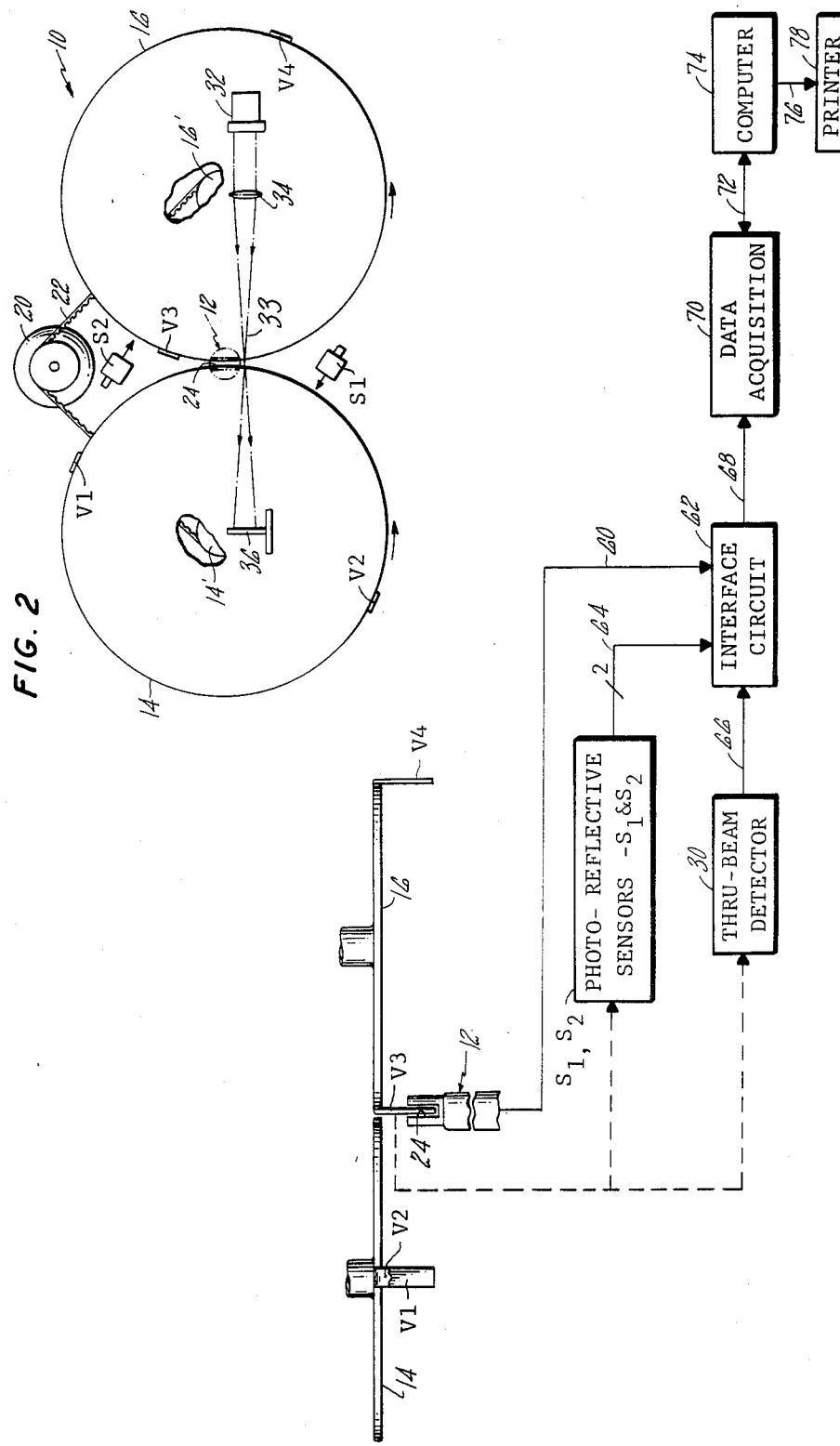

METHOD AND APPARATUS FOR MEASURING HYSTERESIS OF A POSITION SENSOR

DESCRIPTION

1. Technical Field

The present invention relates to a test method and apparatus associated with a position sensor and more particularly to a method for measuring the hysteresis of a position sensor for a reciprocating element.

2. Background Art

A variety of sensors exist for sensing and/or determining the position of various elements which move relative to one another. Occasionally it is required to determine the endpoint of a reciprocating element, as for instance the top dead center (TDC) position of a piston in a reciprocating internal combustion engine. In the U.S. Pat. Nos. 4,407,155 and 4,433,572 of Sundeen, there is described a system for determining the top dead center position of a piston in a reciprocating engine. That system employs a sensor which is fixedly mounted in a cylinder wall for sensing the position of a piston and providing electrical signals indicative thereof.

Specifically, that sensor has a sensing region defined by a bifurcated tip comprised of two arms separated by an air gap. Each arm houses an electrical winding, one serving to couple electrical energy to the other. A vane mounted on the side of the piston reciprocates up and down by the sensing region, i.e., through the air gap, to provide event timing signals representative of the passage of the leading and trailing edges of the vane through the sensor. As a leading edge of the vane passes between the arms of the sensor on the upstroke of the piston, there will occur a first transition in the modulated signal which is followed by a second transition of opposite sense when the trailing edge of the vane completes its passage by the sensor. As the piston completes its passage through the TDC position and is into its downward stroke, the same transitions occur in the modulated waveform as the vane passes through the sensor, however, it will be appreciated that the edges of the sensor comprising the leading and trailing edges on the upstroke are reversed during the downstroke. If it is assumed that the transitions in the modulated signal occur precisely upon the leading and trailing edges of the vane transitioning by the sensor, it will be understood that the first signal transition on the upstroke and the last signal transition on the downstroke are symmetrically disposed respectively before and after the TDC position and alternatively, the second transition on the upstroke and the first transition on the downstroke are also symmetrically disposed before and after the TDC position respectively. Using that information occasioned by the event timing signals, it is then possible to accurately establish the time or position at which TDC occurs. Such determination of the instant of TDC may then be used as a timing reference for various engine operation events.

The foregoing presumes an instantaneous transition in the modulated signal precisely at each instant the leading edge and the trailing edge of the vane pass by the sensing region of the sensor. In reality, however, the characteristics of the sensor are such that it possesses a degree of hysteresis. Such hysteresis will typically serve to delay slightly the instant of signal transition relative to the actual transit of a vane leading or trailing edge by the sensor. Indeed, the hysteresis delay may differ between a leading edge and a trailing edge transition. Moreover, this hysteresis characteristic is not constant in all such sensors but will vary slightly from sensor to sensor depending upon a variety of manufacturing tolerances including the distribution of the turns of each coil and their precise position with respect to each other. Additionally or alternatively, the circuitry of the sensor may possess an inherent hysteresis.

While some degree of variation resulting from this hysteresis characteristic is tolerable in the determination of the TDC position, such range of acceptable variation does have its limit. In one diesel engine system in which the vane passes the sensor at a predetermined position relative to the TDC position, it has been determined that for an engine speed of 1250 rpm, the vane speed is approximately 5400 mm per second. Under these conditions, it has been determined that the maximum tolerable TDC error is approximately 20 microseconds. Because the TDC error value is one-half that of the hysteresis error, this implies a maximum acceptable hysteresis error of 40 $\mu$s. Therefore, it is important that only position sensors possessing characteristics within the acceptable limits be accepted and used in conjunction with an engine. This determination should be made as early as possible, preferably before the sensor is installed in an engine.

DISCLOSURE OF INVENTION

Accordingly, it is an object of the invention to provide a method and apparatus for measuring the hysteresis of a position sensor, as of the type used for sensing the TDC position of a piston. Included within this object is the ability to make such measurement prior to installation of the sensor within an engine.

In accordance with the invention there is provided a method and apparatus for measuring the hysteresis error of a position sensor for a reciprocating element, such as the sensor for determining piston TDC in a reciprocating engine. The sensor is of the proximity type in which a sensing region detects the passage of a vane thereby and may, for instance, have a pair of electrical windings separated by an air gap through which the vane relatively passes. Event timing signals are provided by voltage transitions occasioned by the leading and trailing edges respectively of the vane passing relatively by, i.e., through, the gap. The method includes moving one or more test vanes through the sensor in a manner to simulate two passes therethrough of a reciprocating vane, thereby to generate the event timing signals from the sensor. Independently of the sensor, reference timing signals are generated which are accurately indicative of the positioning of the leading and trailing edges of the one or more test vanes. These reference timing signals are symmetrically disposed with respect to the position to be determined, i.e. TDC. Two event timing signals from the sensor are then compared with their respective corresponding reference timing signals and a difference value is determined for each of those two comparisons. Finally, the two difference values are compared to determine a further difference value, that further difference value being a measure of the hysteresis error.

In the test arrangement, a pair of separate test vanes may be mounted on opposite ones of a pair of rotating discs and are positioned and driven such that the two vanes simulate the upward and downward passage of a vane by the sensor during normal engine operation. Accurate reference timing signals are provided as by optically sensing the precise positioning of the leading and trailing edges of the vanes near their respective passages by the sensor. The time difference between the sensor-provided event signal and the corresponding reference timing signal is determined for at least those two vane positions which are symmetrically disposed on opposite sides of the TDC position to be determined. The two aforementioned time difference values are compared to determine a further difference value which corresponds with the hysteresis error.

BRIEF DESCRIPTION OF THE DRAWINGS

FIG. 2 is a simplified schematical illustration depicting the sensor test arrangement of the invention;

FIG. 3 is a generalized schematical block diagram of the signal processing portion of the test arrangement depicted in FIG. 3.

BEST MODE FOR CARRYING OUT THE INVENTION

Figure 1:
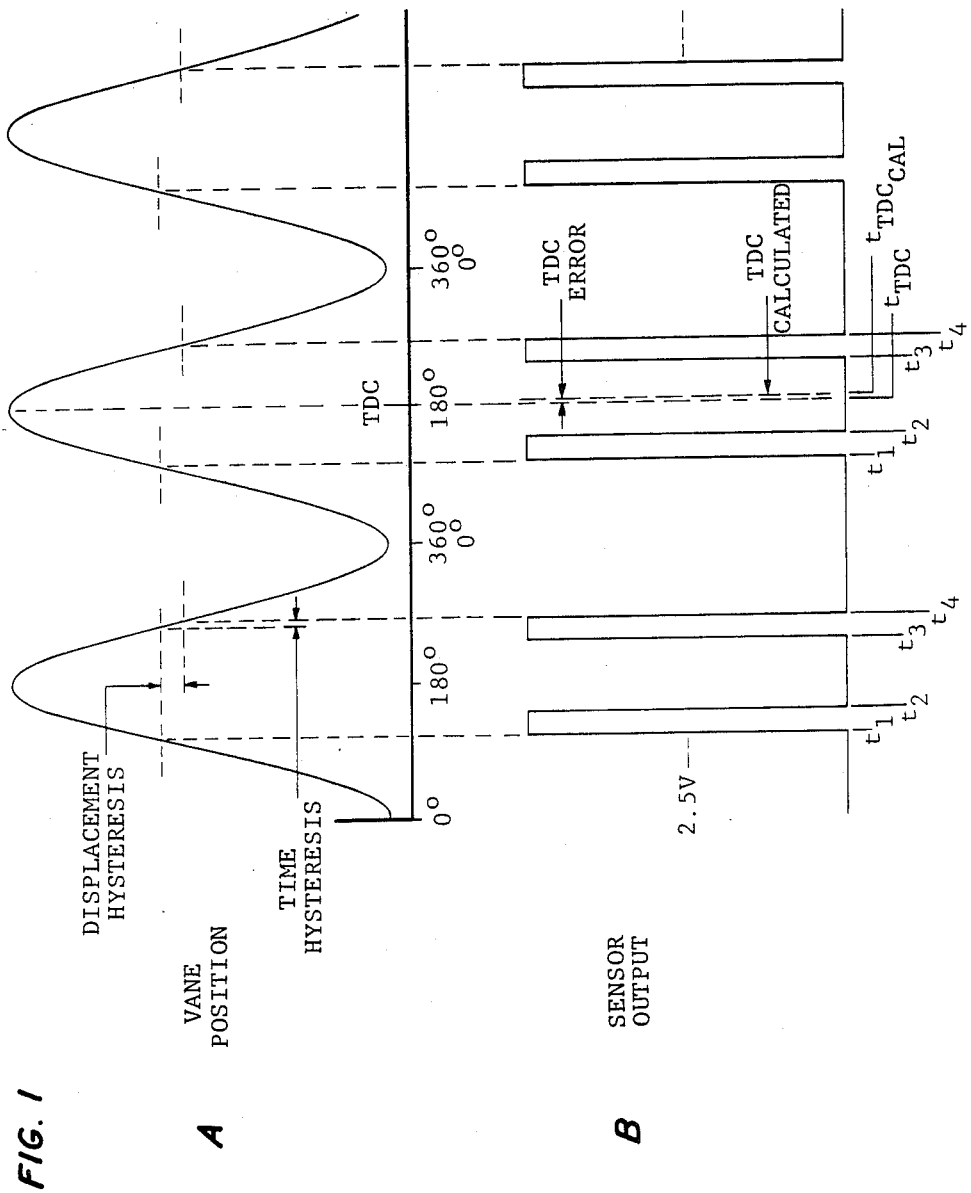
FIG. 1 is a graph depicting piston vane position and the resulting sensor output as a function of time and showing the effects of displacement hysteresis.

FIGS. 1A and 1B respectively depict graphs of the position of a vane which reciprocates with a piston in an internal combustion engine and a graph of the resulting output signals provided by a position sensor of the type disclosed in the aforementioned U.S. Pat. Nos. 4,407,155 and 4,433,572. As mentioned in those patents, a metal vane attached to the piston passes the sensing portion of the sensor on the upstroke and downstroke of the piston, producing two output pulses from the sensor for each revolution of the engine. Those two output pulses are depicted as occurring between times t1 and t2, and t3 and t4, respectively in the graph of FIG. 1B. The graph of FIG. 1A depicts the actual position of the piston vane as it moves with the piston throughout successive piston cycles. The peak of that reciprocating waveform is representative of the top dead center (TDC) position of the piston.

The piston vane typically includes a pair of parallel edges, one leading and one trailing as the vane passes between the coil-containing arms of the position sensor. The length of the piston vane in the direction of piston motion is approximately 0.3 inch and the dimension of the coils in the sensor in that same direction is approximately the same.

FIG. 1B reflects the output from the sensor as the vane moves relatively through the gap between the coil-containing arms. It will be appreciated that the polarity of the waveform illustrated in FIG. 1B herein is inverted from that illustrated in FIG. 4 in each of the two aforementioned patents. Times t1 and t2 generally correspond with the passage of the leading and trailing edges respectively of the piston vane through the sensor on the piston upstroke, and times t3 and t4 generally correspond with the passage of the reversed leading and trailing edges, respectively, on the downstroke. However, it will be noticed by projection of the timing events of the FIG. 1B waveform onto the vane position waveform of FIG. 1A that the times t1 and t4 are not symmetrically displaced, in angle or time, relative to the TDC position of the piston. This lack of symmetry is occasioned by the inherent hysteresis characteristic of a particular sensor and may be characterized either as a displacement hysteresis or a time hysteresis, the latter having the most direct bearing upon the utilization of the sensor in timing applications. For a time hysteresis error of given magnitude as illustrated in FIG. 1A, the error between the actual TDC and the calculated TDC will be one-half that magnitude as represented by the TDC error in FIG. 1B. This is occasioned by the fact that TDC is a time bisector of two reference positions equally disposed about TDC.

As mentioned, it is important that the TDC error not exceed some specified value, as for instance 20 $\mu$s at 1250 rpm. Correspondingly, the time hysteresis error, H, for a particular sensor must not exceed a value which is twice as great as the TDC error, or 40 $\mu$s.

Referring to FIGS. 2 and 3, there is illustrated a system 10 for determining the hysteresis error of a piston position sensor 12 for which that value must be determined. The test arrangement 10 uses two rotating discs 14 and 16. A pair of vanes V1 and V2 are diametrically opposite one another and extend from disc 14 near its periphery and a corresponding pair of vanes V3 and V4 are similarly arranged on disc 16. Vanes V1 and V3 are intended to simulate the passage of a piston vane by the sensor 12 during the upstroke and the downstroke respectively of a piston. The vanes V2 and V4 are used only for the purpose of counter-balancing the vanes V1 and V3 respectively, and serve no other function with test apparatus 10. The test vanes V1 and V3 are sized to approximately correspond with the size of an actual vane mounted on a piston within an engine.

Each disc 14, 16 has a diameter of approximately 4.5 inches and the vanes V1–V4 are mounted at the periphery in a suitable manner. For instance, the vanes V1–V4 may be bolted, keyed or bonded to the discs 14, 16, or they may be integrally formed as parts of those discs. Each of the discs 14, 16 is mounted for rotation about a respective central axis, the axes of the two discs being disposed parallel to one another. Each of the discs 14, 16 includes a respective sprocket 14', 16'. The discs 14, 16 are disposed such that they are substantially tangent to one another and in the same plane.

In the illustrated embodiment, a motor 20 drives a toothed belt 22 which engages the sprockets 14' and 16' and rotates the discs 14 and 16 in the directions indicated by the associated arrows. The toothed belt 22 assures that the vanes V1–V4 remain in a predetermined constant relation to one another so that they do not collide. That relation is selected to provide approximately a 90° separation between vanes. The radial positioning of the discs 14 and 16 is such that each of the vanes V1–V4 passes centrally through the gap 24 formed between the arms of the position sensor 12. The motor 20 drives the discs 14, 16 at 900 rpm and the diameter of those discs is such that the vanes V1–V4 have a speed of approximately 5400 mm per second, which corresponds with the nominal speed of a piston vane as it passes the position sensor in an engine operating at approximately 1250 rpm.

If flexure of belt 22 could give rise to speed surges between the two discs 14, 16, it may be desirable to provide individual, identical motors driving each of the discs. A toothed belt would then couple the discs, as via sprockets 14' and 16', to provide and assure phase and speed integrity.

Two photo-reflective sensors, S1 and S2 serve to provide trigger signals for indicating that a test vane V1 or V3 is about to interrupt the sensor under test. The sensors S1 and S2 are oriented such that each views the passing vanes on a respective disc 14 or 16. Each of the sensors S1 and S2 emits light from a light-emitting diode (LED) which is reflected by the respective test vane to a phototransistor within the respective sensor. One vane on each disc, i.e. vanes V2 and V4, are darkened so as to be nonreflective and thus not "seen" by the photo-reflective sensors S1 and S2.

A thru-beam detector, designated as 30 in FIG. 3, is utilized to generate, independently of the sensor 12, reference timing signals which are accurately indicative of the positioning of the leading and trailing edges of the test vanes V1 and V3 in the region of the sensor 12. The thru-beam detector 30 in FIG. 3 includes, as depicted in FIG. 2, a source 32 of monochromatic collimated light, a focus lens 34 and a high-speed P.I.N. photodiode 36. The light emitted by source 32 is passed through lens 34 to form a beam 33 that is focused on the imaginary plane which passes through the gap 24 of sensor 12 and is substantially tangent to both of the discs 14 and 16. This point is also selected to be closely adjacent to one or the other of the entering and exit sides of the gap 24 through the sensor 12. In this way the test vanes V1 and V3 will break the beam 33 of detector 30 rapidly and in substantially equal manners. The diode 36 has a switching time under one nanosecond such that its response time does not affect the error measurement.

Figure 4:
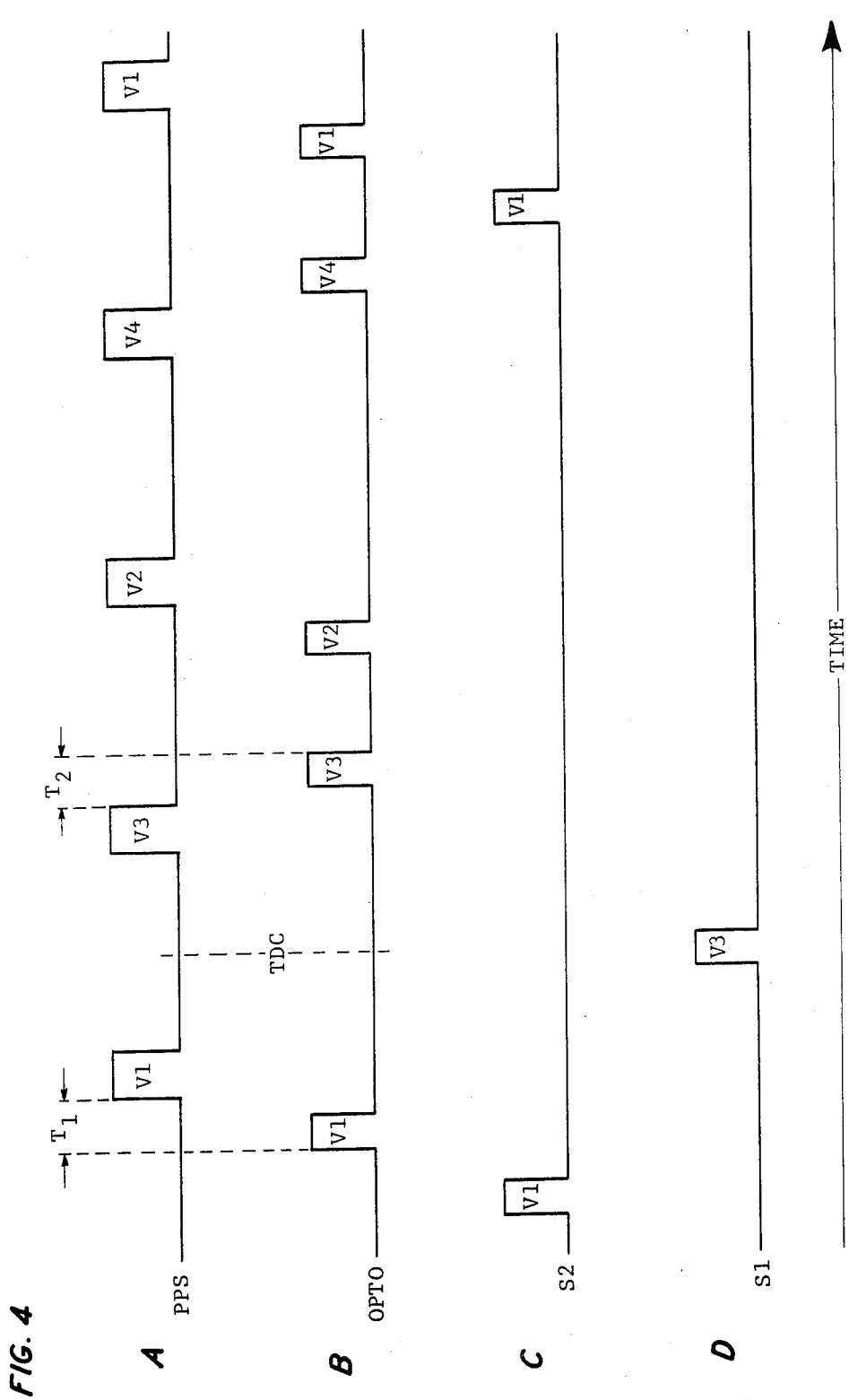
FIG. 4 is a graph depicting the various waveforms provided by the test system of FIG. 2.

Referring to the graphical illustrations of FIG. 4, the waveform of FIG. 4A depicts the output signal from the position sensor 12; the waveform of FIG. 4B depicts the output signal from the optical thru-beam detector 30; the waveform of FIG. 4C depicts the output of photo-reflective sensor S1; and the waveform of FIG. 4D depicts the output of photo-reflective sensor S2.

Referring to the operation of test system 10 with particular reference to FIGS. 2 and 4, in one revolution of the discs 14 and 16 both the sensor 12 under test and the optical beam of the thru-beam detector 30 will be interrupted four times, once by each of the vanes V1–V4. Vane V1 will interrupt the optical thru-beam of detector 30 and then the sensor 12, while vane 3 produces the opposite sequence. This relative timing is reflected in the waveforms of FIGS. 4A and 4B. Although signals are also provided for the passage of vanes V2 and V4, the control signals provided by photo-reflective sensors S1 and S2 assure that they will be ignored in the subsequent determination of hysteresis error.

The rising edge of the pulse for the vane V1 in the waveform of FIG. 4B should occur at the same position in the test system 10 as the trailing edge of the pulse for vane V3, thus making them symmetrical with respect to an apparent TDC position. A similar situation exists with respect to the descending or trailing edge of the vane V1 pulse in FIG. 4B relative to the rising edge of the vane V3 pulse. For this reason, either of these two pairs of pulse edges may be used as accurate reference timing signals against which the corresponding events provided by the output of sensor 12 as represented by FIG. 4A may be compared.

In the illustrated embodiment, the leading edge of vane V1 and the trailing edge of vane V3 are the positions or events which serve as references. Accordingly, the interval $T_1$ between the leading edge of the vane V1 as determined by sensor 12 in FIG. 4A and as determined optically in FIG. 4B is compared with the interval $T_2$ between the trailing edge of vane V3 also determined in those manners in FIGS. 4A and 4B. The interval $T_1$ represents the delay between the accurately-determined leading edge of vane V1 and the position of that edge as determined by the sensor 12. Similarly, the interval $T_2$ represents the delay between the accurately determined descending edge of vane V3 and the similar position of that vane as determined by the position sensor 12. In the absence of any hysteresis, the intervals $T_1$ and $T_2$ will be equal; on the other hand, the magnitude of any difference between the intervals $T_1$ and $T_2$ is a measure of the hysteresis error, H.

Referring briefly to FIG. 3, the output signal from sensor 12 is extended via line 60 to appropriate interface circuitry 62. Similarly, the outputs from the pair of photo-reflective sensors S1 and S2 are also extended to interface circuit 62 via a pair of lines, only one being illustrated and designated as 64. Further, the output signal from the thru-beam detector 30 is extended to interface circuit 62 via lead 66. The signals provided to the interface circuitry 62 are conditioned therein and then relayed, as represented by lead 68, to suitable data acquisition circuitry 70 which in turn interacts, as represented by the bidirectional lead 72, with a suitable computer or electrical signal processing circuitry 74.

It is the function of computer 74 to determine the time values, as in microseconds, for each of the intervals $T_1$ and $T_2$. In each instance, that involves determining the time difference between the accurate reference timing signal and its corresponding counterpart determined via sensor 12. Upon determining the value of intervals T1 and T2, they are then compared to determine a further value, specifically a difference value, which is a measure of the hysteresis error. The time difference between the magnitudes or values of intervals T1 and T2 corresponds with the hysteresis, H, of the respective sensor 12. The value, H, of hysteresis may then be provided as an output from computer 74 via lead 76 to a suitable output device, as for instance a printer/plotter 78. In this way an accurate determination of the hysteresis of a particular sensor 12 is provided. Alternatively, the output from computer 74 may be of a "pass/fail" nature such that a hysteresis value exceeding 40 μs, for instance, would fail and a lesser value would pass.

Although this invention has been shown and described with respect to detailed embodiments thereof, it will be understood by those skilled in the art that various changes in form and detail thereof may be made without departing from the spirit and scope of the claimed invention. For instance, although the position sensor described relies upon passage of a vane through a gap between two coils, it will be appreciated that the invention is similarly applicable to other proximity-type sensors, such as of the Hall-effect type, for which a determination of hysteresis is to be made.

Having thus described a typical embodiment of our invention, that which is claimed as new and desired to secure by Letters Patent of the United States is:

1. A method for measuring the hysteresis error of a position sensor for a reciprocating element, the sensor having a sensing region by which a vane relatively passes, event timing signals being provided by voltage transitions occasioned by the leading and trailing edges respectively of a respective vane passing relatively by said sensing region, and a position determination requiring two relative passes of a said vane and being determined to be the midpoint between symmetrical said timing signals, the method comprising the steps of:

moving one or more test vanes by said sensing region in a manner to simulate two passes thereby of a reciprocating vane, thereby to generate said event timing signals from said sensor;

generating, independently of the sensor, reference timing signals which are accurately indicative of the positioning of the leading and trailing edges of said one or more test vanes;

comparing a said event timing signal with a respective corresponding said reference timing signal for each of two said reference timing signals symmetrically disposed with respect to the position to be determined and determining a difference value for each of said two comparisons; and comparing said two difference values to determine a further difference value, said further difference value being a measure of the hysteresis error.

2. The method of claim 1 wherein said step of moving said test vanes comprises moving a pair of test vanes in opposite directions relative to one another and past the sensor.

3. The method of claim 2 wherein said step of moving said pair of test vanes in relatively opposite directions includes the step of fixing each said test vane to a respective one of a pair of rotating members, said rotating members being substantially tangential where said test vanes pass the sensor, and driving said rotating members in the same direction to move said test vanes in opposite directions past the sensor.

4. The method of claim 1 wherein said step of generating accurate reference timing signals includes the step of optically sensing the leading and trailing edges of said one or more test vanes and providing electrical signals indicative thereof.

5. Apparatus for measuring the hysteresis error of a position sensor for a reciprocating element, the sensor having a sensing region past which a vane relatively moves, event timing signals being provided by voltage transitions occasioned by the leading and trailing edges respectively of a respective vane passing relatively by said sensing region, and a position determination requiring two relative passes of a said vane and being determined to be the midpoint between symmetrical said timing signals, the measuring apparatus comprising:

means for moving a pair of test vanes past said sensing region of said sensor in relatively opposite directions to simulate two passes thereby of a reciprocating vane and thereby generating said event timing signals from said sensor;

means for generating, independently of the sensor, reference timing signals which are accurately indicative of the positioning of the leading and trailing edges of said pair of test vanes;

means for comparing a said event timing signal with a respective corresponding said reference timing signal for each of two said reference timing signals symmetrically disposed with respect to the position to be determined and providing a difference value for each of said two comparisons; and means for comparing said two difference values to determine a further difference value, said further difference value being a measure of the hysteresis error.

6. The measuring apparatus of claim 5 wherein said means for moving said pair of test vanes past the sensor in relatively opposite directions includes a pair of rotating members, a respective said test vane being affixed to each said rotating member, said rotating members being disposed in substantially tangential relation in the region where said test vanes pass said sensor, and means for driving said rotating members in the same rotational direction whereby said respective test vanes pass said sensor in opposite directions.

7. The measuring apparatus of claim 6 wherein said means for generating said accurate reference timing signals includes an optical detector for sensing the passage of the leading and trailing edges of said test vanes at a predetermined location and providing electrical signals representative thereof.

* * * * *